United States Patent
Kikuchi (10) Patent No.: US 8,463,064 B2
(45) Date of Patent: Jun. 11, 2013

(54) IMAGE PROCESSING APPARATUS AND IMAGE PROCESSING METHOD FOR CORRECTING IMAGE BLUR

(75) Inventor: Tomoe Kikuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 12/762,447

(22) Filed: Apr. 19, 2010

(65) Prior Publication Data

US 2010/0296749 A1   Nov. 25, 2010

(30) Foreign Application Priority Data

May 21, 2009  (JP) ................................. 2009-123540

(51) Int. Cl.
*G06K 9/40* (2006.01)
(52) U.S. Cl.
USPC .......................................... 382/255; 382/162
(58) Field of Classification Search
USPC .......................................... 382/254, 255, 162
See application file for complete search history.

(56) References Cited

U.S. PATENT DOCUMENTS

| | | | | |
|---|---|---|---|---|
| 5,659,357 A | * | 8/1997 | Miyano ....................... | 348/223.1 |
| 6,952,225 B1 | * | 10/2005 | Hyodo et al. ............... | 348/223.1 |
| 7,065,255 B2 | * | 6/2006 | Chen et al. ................. | 382/260 |
| 8,224,111 B2 | * | 7/2012 | Mishima et al. ............ | 382/265 |
| 2006/0239549 A1 | * | 10/2006 | Kelly et al. ................. | 382/167 |
| 2006/0262198 A1 | * | 11/2006 | Une ............................ | 348/223.1 |
| 2009/0080790 A1 | * | 3/2009 | Hasegawa ................... | 382/260 |
| 2009/0263018 A1 | * | 10/2009 | Murakami et al. .......... | 382/167 |
| 2010/0008573 A1 | * | 1/2010 | Tajbakhsh et al. .......... | 382/167 |

FOREIGN PATENT DOCUMENTS

| | | |
|---|---|---|
| JP | 62-127976 A | 6/1987 |
| JP | 4-088765 A | 3/1992 |
| JP | 7-245764 A | 9/1995 |
| JP | 8-289314 A | 11/1996 |
| JP | 2000-224608 A | 8/2000 |
| JP | 2004-205802 A | 7/2004 |
| JP | 2004205802 A * | 7/2004 |

OTHER PUBLICATIONS

Hsu et al., "Light mixture estimation for spatially varying white balance," ACM Trans. Graph., 27(3), 2008.*

* cited by examiner

*Primary Examiner* — Barry Drennan
*Assistant Examiner* — Andrew Moyer
(74) *Attorney, Agent, or Firm* — Fitzpatrick, Cella, Harper & Scinto (57) ABSTRACT

Captured image data is inputted, and a type of light source in capturing the image data is determined. Then a recovery file corresponding to the determination result and the uncertainty of the determination result is set, and a recovery process for the image data is performed using the set recovery filter.

9 Claims, 9 Drawing Sheets

| CAMERA MODEL | LENS TYPE | FILTER LIST NUMBER |
|---|---|---|
| CAMERA 1 | LENS A | 1A |
| CAMERA 2 | LENS B | 2B |
| CAMERA 3 | LENS C | 3C |
| | LENS D | 3D |
| | LENS E | 3E |
| | OTHER LENSES | 30Z |
| CAMERA 4 | LENS C | 4C |
| | LENS E | 4E |
| | LENS F | 4F |
| | LENS G | 4G |
| | OTHER LENSES | 40Z |
| CAMERA 5 | LENS D | 5D |
| ⋮ | ⋮ | ⋮ |

FIG. 8B

| FILTER LIST:1A | | |
|---|---|---|
| LIGHT SOURCE | FILTER SIZE | FILTER COEFFICIENT |
| CLEAR WEATHER | 5×5 | ......... |
| SHADE | 5×5 | ......... |
| SUNLIGHT COLOR FLUORESCENT LAMP | 7×7 | ......... |
| ⋮ | ⋮ | ......... |
| OTHER LIGHT SOURCES | 5×5 | ......... |

FIG. 9A

IMAGE PROCESSING APPARATUS AND IMAGE PROCESSING METHOD FOR CORRECTING IMAGE BLUR

BACKGROUND OF THE INVENTION

1. Field of the Invention

The present invention relates to image processing for correcting a blur of an image.

2. Description of the Related Art

Known image recovery algorithms recover an image captured by an image capture apparatus from degradation due to, for example, out of focus, aberration, or camera shake. For example, one method describes the characteristic of image degradation by a point spread function (PSF) and recovers a non-degraded image based on the PSF. Japanese Patent Laid-Open No. 62-127976, for example, discloses, as such an image recovery algorithm, a method of correcting a blur of an image by filter processing with a characteristic inverse to a PSF.

Let $(x,y)$ be position coordinates within an image, $o(x,y)$ be a non-degraded image (to be referred to as a subject image hereinafter), $z(x,y)$ be an image suffering from degradation (to be referred to as a degraded image hereinafter), and $p(x,y)$ be the PSF describing information on point images spreading due to a blur. These three characteristics $z(x,y)$, $o(x,y)$, and $p(x,y)$ satisfy:

$$z(x,y) = o(x,y) * p(x,y) \quad (1)$$

where * represents convolution calculation.

Equation (1) can be rewritten as an integral equation:

$$z(x,y) = \iint o(x,y) p(x-x', y-y') dx' dy' \quad (2)$$

Equation (2) is Fourier-transformed into the domain of a spatial frequency $(u,v)$ as:

$$Z(u,v) = O(u,v) \cdot P(u,v) \quad (3)$$

where $Z(u,v)$ is the spectrum of $z(x,y)$, $O(u,v)$ is the spectrum of $o(x,y)$, and $P(u,v)$ is the spectrum of $p(x,y)$.

Note that $P(u,v)$ is a modulation transfer function (MTF) as the absolute value of an optical transfer function (OTF) which is the two-dimensional Fourier transform of the PSF.

As long as the PSF $p(x,y)$ can be known in some way in addition to the degraded image $z(x,y)$, a spectrum $O(u,v)$ of the subject image can be calculated by calculating the spectra of $z(x,y)$ and $p(x,y)$ and using an equation obtained by rewriting equation (3) as:

$$O(u,v) = Z(u,v) / P(u,v) \quad (4)$$

where $1/P(u,v)$ is called the inverse filter.

There often exists a frequency at which the MTF value of degradation is zero. That the MTF value is zero means that there exists a frequency component which is not transferred (whose information is lost) due to degradation. When there exists a frequency at which the MTF value is zero, the subject image cannot be perfectly recovered. Hence, there often exists a frequency at which the inverse filter of an MTF has an infinite coefficient, and the subject image has an indefinite spectrum value at that frequency.

Under the circumstances, to prevent the coefficient of the inverse filter from becoming infinite, a Wiener filter described by:

$$P(u,v) / \{|P(u,v)|^2 + c\} \quad (5)$$

is often used for image recovery, where $c$ is a very small constant.

An inverse filter or a Wiener filter will be referred to as a "recovery filter" hereinafter. The coefficient of a recovery filter is inversely proportional to the MTF and therefore increases as the MTF comes close to zero. That is, recovery filters for frequencies with great degradation have very high coefficients. Thus, if a PSF for use in calculation of a recovery filter is different from that of an actual blurred image, filter processing amplifies their difference though it may be small. In other words, an accurate PSF is desirably acquired to recover an unblurred subject image from a degraded image.

A PSF is well known to change depending on the image height, the zoom ratio, the subject distance, and the stop. In view of this, one proposed method calculates a PSF in accordance with these items of image capture information and feeds them back to a recovery process. For example, Japanese Patent Laid-Open No. 4-088765 estimates a PSF corresponding to the subject distance and uses it for recovery from image degradation. Japanese Patent Laid-Open No. 2004-205802 pays attention to the fact that a change in luminance of a subject in the shutter open duration is large when a flash is used, and the PSF at this time is different from that in the shutter open duration when no flash is used (a change in luminance is less). In this case, a recovery process is performed by correcting the PSF when a flash is used.

However, the PSF differs depending on the type of light source in image capture even when the image height, the zoom ratio, the subject distance, and the stop are the same and a change in luminance in the shutter open duration is uniform. For example, the PSF under light source A is different from that under a warm white fluorescent lamp.

Figure 1A:
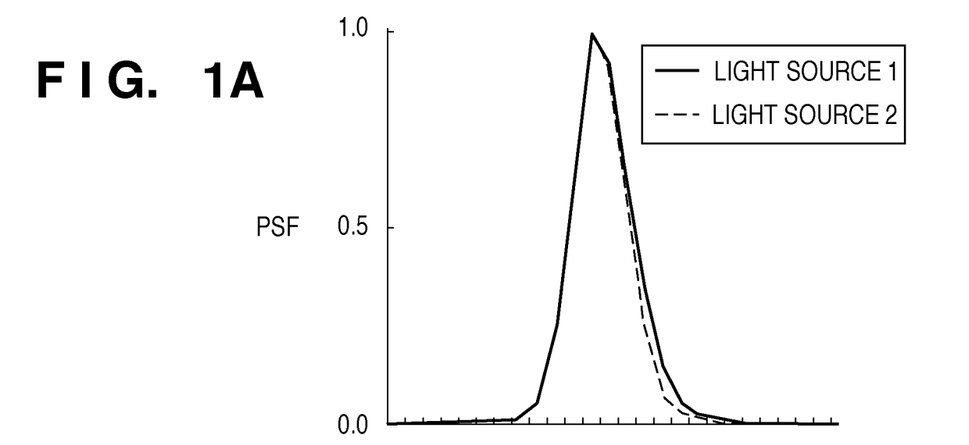
FIG. 1A is a graph showing PSFs.

FIG. 1A is a graph showing PSFs. Note that a plot of the PSF values has a three-dimensional shape because point images spread in the vertical and horizontal directions of the image. However, for the sake of easy explanation, the PSF values are two-dimensionally plotted by paying attention to only a one-dimensional direction of the image in FIG. 1A.

FIG. 1A shows PSFs when the image height, the zoom ratio, and the subject distance are the same and a change in luminance in the shutter open duration is uniform under two different light sources. However, the two light sources generate different point image spreading characteristics, that is, different PSFs.

Figure 1B:
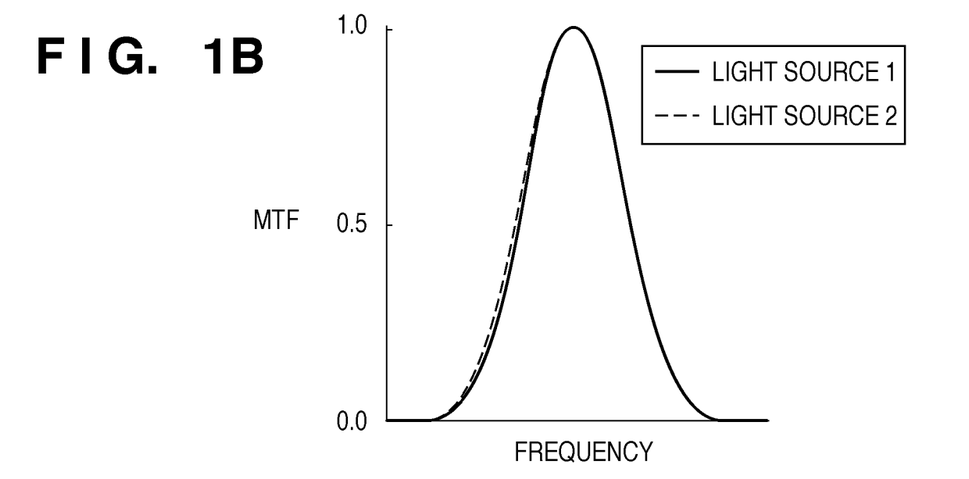
FIG. 1B is a graph showing the MTFs of the Fourier transforms of the PSFs shown in FIG. 1A.

FIG. 1B is a graph showing the MTFs of the Fourier transforms of the PSFs shown in FIG. 1A. In FIG. 1B, the abscissa indicates the spatial frequency, the origin indicates zero frequency, and the frequency increases in a direction away from the origin. The MTFs shown in FIG. 1B have only a small difference between the two light sources except in the vicinities of the two ends of the graph corresponding to high-frequency components.

Figure 1C:
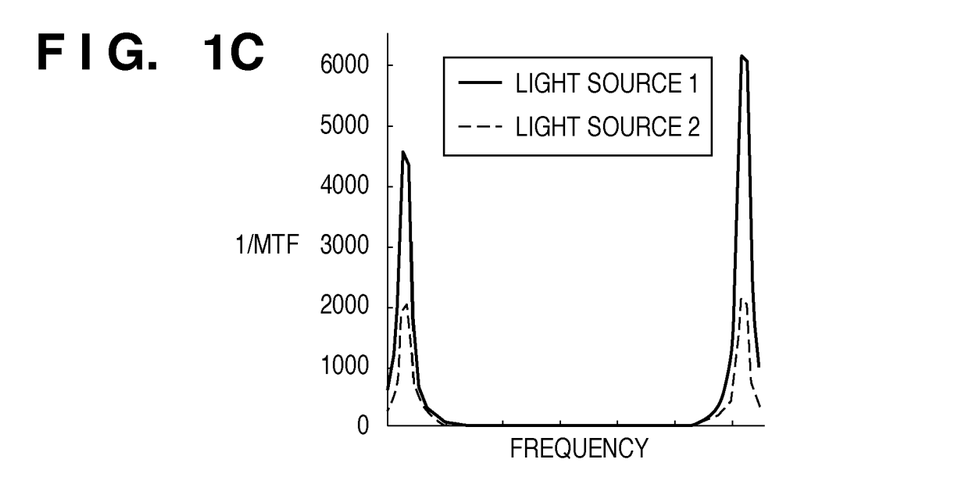
FIG. 1C is a graph showing the reciprocals of the MTFs shown in FIG. 1B.

FIG. 1C is a graph showing the reciprocals of the MTFs. That is, FIG. 1C is a graph describing the spatial frequency characteristics of recovery filters. As can be seen from FIG. 1C, high-frequency components have only a small difference between the MTFs shown in FIG. 1B, but they have a large difference between the reciprocals of the MTFs.

It is therefore difficult to obtain a satisfactory recovery result even by using recovery filters created using the PSFs of different light sources. That is, if an image captured under light source 1 undergoes a recovery process using a recovery filter created based on the PSF of light source 2, high-frequency components are insufficiently recovered. As a result, the image after the recovery process still remains blurred. In contrast, if an image captured under light source 2 undergoes a recovery process using a recovery filter created based on the PSF of light source 1, high-frequency components are excessively recovered. As a result, image degradations such as stains or ringing occur. Depending on the circumstances involved, the image after recovery may even be poorer in quality than that before recovery.

Figure 2A:
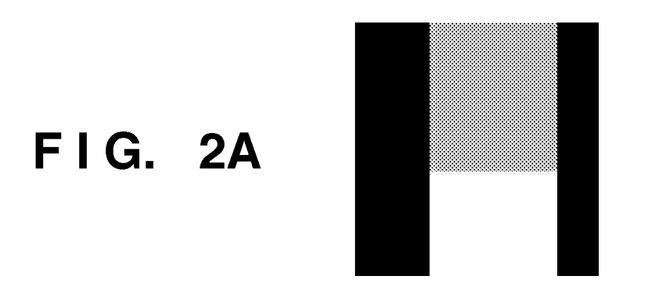
FIGS. 2A to 2D are views for explaining a negative effect of a recovery process.
Figure 2B:
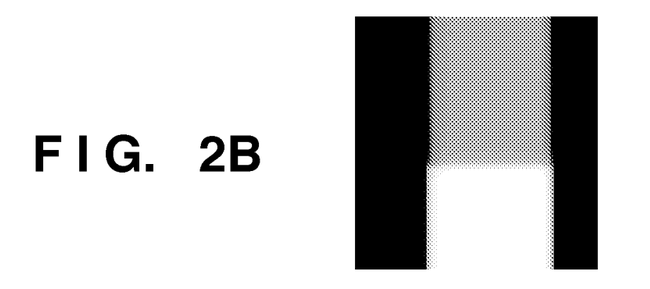

FIGS. 2A to 2D are views for explaining the negative effects in a recovery process. FIG. 2A shows a subject image, and FIG. 2B shows an image generated by blurring the subject image based on the PSF of a certain light source (light source 3).

Figure 2C:
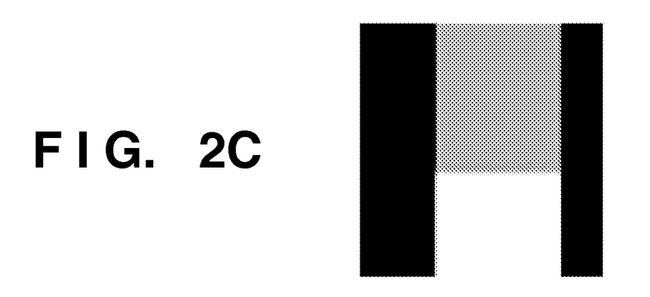

FIG. 2C shows an image (to be referred to as a recovered image hereinafter) obtained by applying a recovery filter optimum for light source 3, created based on the reciprocal of an MTF associated with light source 3, to the image shown in FIG. 2B. A satisfactory recovery result is obtained in the recovered image shown in FIG. 2C.

Figure 2D:
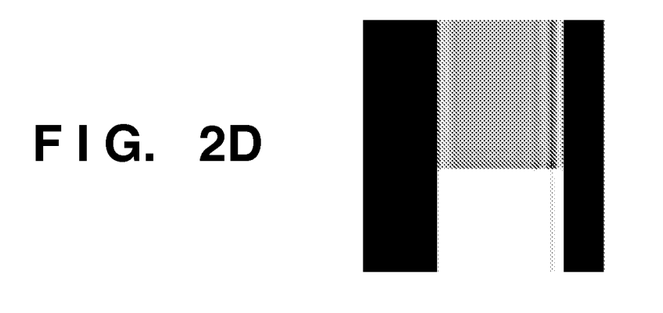

In contrast, FIG. 2D shows a recovered image obtained by applying a recovery filter optimum for a light source (light source 4) different from light source 3 to the image shown in FIG. 2B. The recovered image shown in FIG. 2D suffers from ringing on its edge portions. Hence, the image after recovery (FIG. 2D) is poorer in quality than the image before recovery (FIG. 2B).

SUMMARY OF THE INVENTION

In one aspect, an image processing method comprising the steps of: inputting captured image data; determining a type of light source used in capturing the image data; setting a recovery filter corresponding to the determination result; and performing a recovery process for the image data using the set recovery filter.

According to the aspect, it is possible to correct a blur of an image by taking account of the uncertainty when determining the type of image capture light source.

Further features of the present invention will become apparent from the following description of exemplary embodiments with reference to the attached drawings.

DESCRIPTION OF THE EMBODIMENTS

Image processing according to embodiments of the present invention will be described in detail below with reference to the accompanying drawings.

First Embodiment

A case in which a recovery process is performed for a captured image within an image capture apparatus such as a digital camera will be exemplified in the first embodiment.
[Apparatus Configuration]

Figure 3:
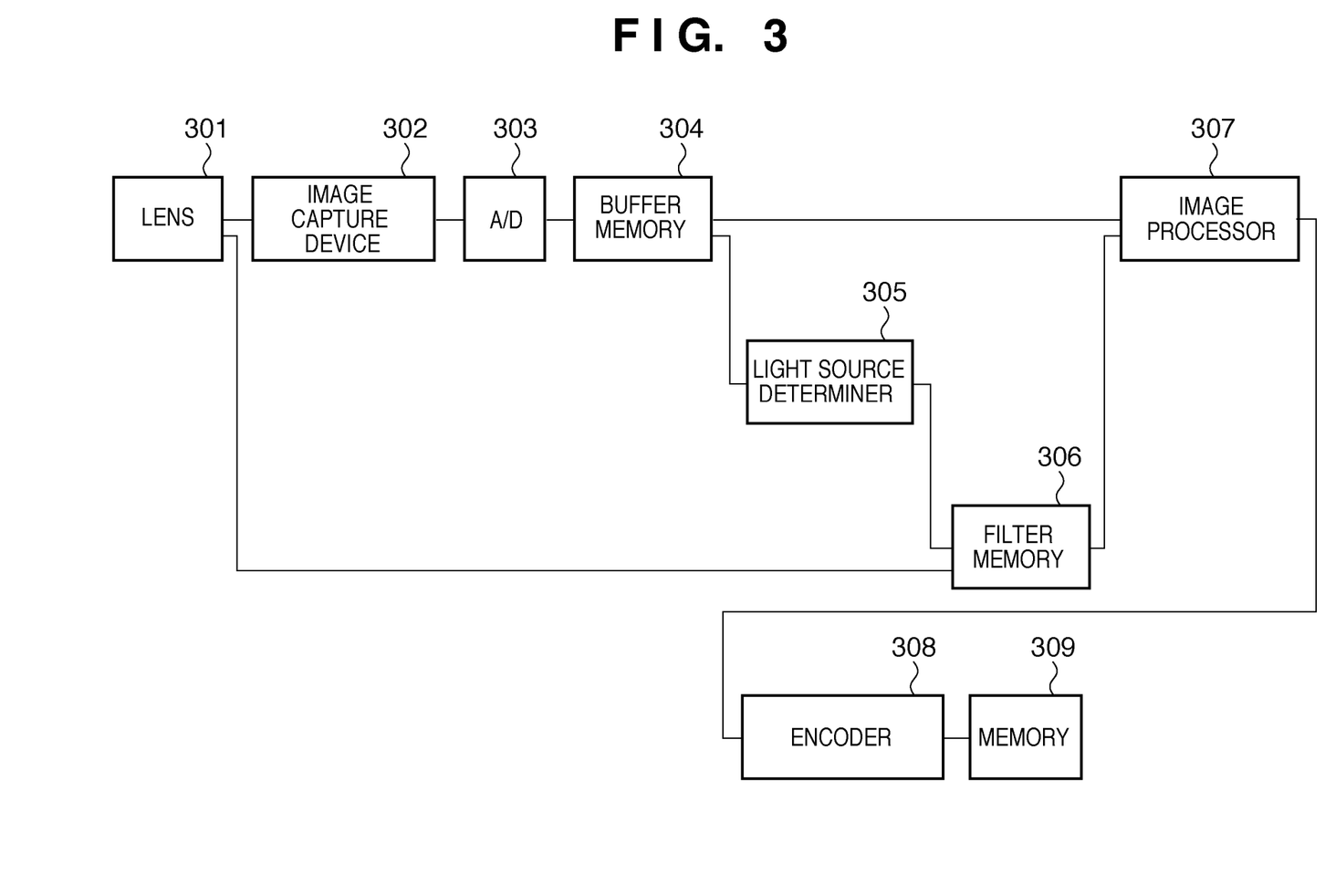
FIG. 3 is a block diagram showing the configuration of an image capture apparatus.

FIG. 3 is a block diagram showing the configuration of an image capture apparatus.

A lens 301 serving as an imaging lens forms an image of light from a subject on the imaging plane of an image capture device 302. The image capture device 302 uses a charge-coupled device (CCD) or a CMOS sensor to output an analog signal corresponding to the light which forms an image on the imaging plane. An analog/digital (A/D) converter 303 stores, in a buffer memory 304, image capture data obtained by converting the analog signal output from the image capture device 302 into a digital signal.

As will be described in detail later, a light source determiner 305 determines the type of light source (image capture light source) in image capture. A filter memory 306 stores a recovery filter.

An image processor 307 performs required types of image processing such as a demosaicing process, a white balance process, a gamma process, and a recovery process for the image capture data input from the buffer memory 304 to generate image data. An encoder 308 compresses the processed image data output from the image processor 307 to convert it into a predetermined image format, and stores the converted data in a memory 309. The memory 309 is a storage medium such as a memory card, and detachable from the image capture apparatus.
[Light Source Determiner]

Information indicating whether a flash was turned on during image capture can be acquired from a controller (not shown) of the image capture apparatus. Hence, a flash is the easiest type of light source to specify. In contrast, the other types of light sources must be determined by some kind of analysis.

The type of light source is explicitly designated by the user for use in white balance adjustment or is automatically estimated or detected by the image capture apparatus. Assume that the user explicitly designates the type of light source. In this case, a value corresponding to the designation (e.g., a color temperature) need only be adopted to define the type of light source.

Assume that the image capture apparatus automatically estimates or detects the type of light source. In this case, a light source detection sensor included in the image capture apparatus acquires light source information (e.g., a color temperature), or the light source is estimated from the captured image.

Some examples of a light source estimation method are as follows. One method changes the type of process in accordance with whether an electronic flash was turned on, and estimates the light source based on an evaluation function that uses the EV of image capture (e.g., Japanese Patent Laid-Open No. 2000-224608). Another method estimates the light source in accordance with the position of a representative value for each block of the captured image within a color difference plane (Japanese Patent Laid-Open No. 8-289314). Still another method estimates the light source by determining which light source has a color temperature detection range including the color temperature for each block of the captured image (Japanese Patent Laid-Open No. 7-245764). In this embodiment, an arbitrary one or an arbitrary combination of these various kinds of methods can be used.

In this embodiment, light sources which can be manually set for use in white balance adjustment are of four types including, for example, clear weather, shade, a sunlight color fluorescent lamp, and a tungsten light. Also, when auto white balance has been set, the light source determiner 305 estimates the light source of one of nine types: a flash, clear weather, shade, a tungsten light, a daylight color fluorescent lamp (D: 5,700 to 7,100 K), a sunlight color fluorescent lamp (N: 4,600 to 5,400 K), a cool white fluorescent lamp (W: 3,900 to 4,500 K), a white fluorescent lamp (WW: 3,200 to 3,700 K), and other light sources. Note that D, N, W, and WW are JIS codes representing the light colors of fluorescent lamps.

[Recovery Filter]

Appropriate recovery filters can be respectively prepared for the eight types of light sources other than "other light sources", estimated by the light source determiner 305. However, the light source determiner 305 does not always perform correct estimation. In order to ease explanation, a case will be considered in which the light source is estimated by calculating the ratios R/G and B/G from the integrated values of the R, G, and B components of the captured image, and these ratios are fit to a light source estimation map.

Figure 4:
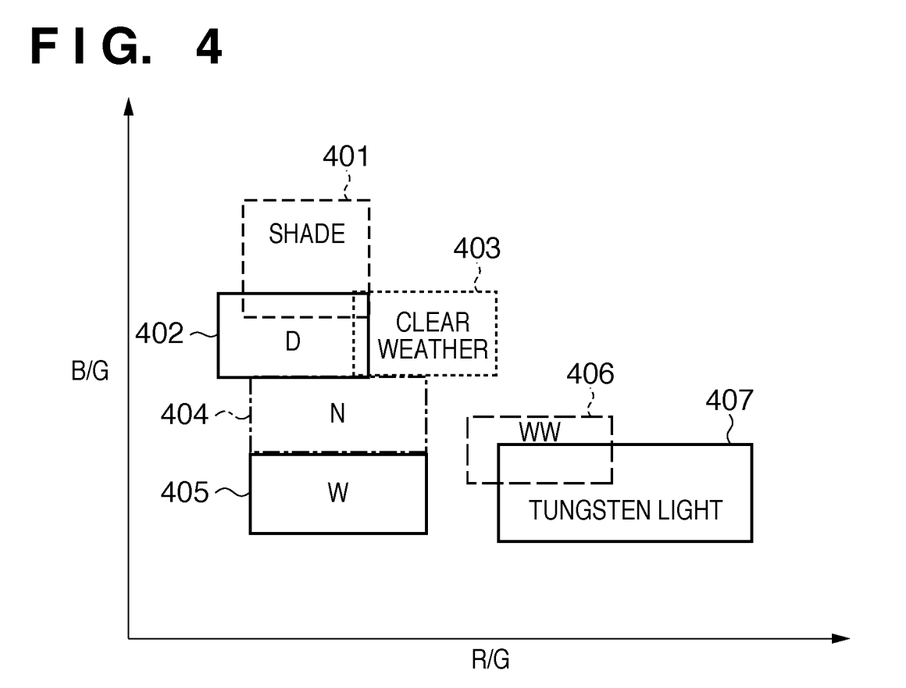
FIG. 4 is a view showing a light source estimation map.

FIG. 4 is a view showing a light source estimation map.

In a region 401, the light source is estimated as "shade". Also, a region 402 corresponds to a "daylight color fluorescent lamp D", a region 403 corresponds to "clear weather", a region 404 corresponds to a "sunlight color fluorescent lamp N", a region 405 corresponds to a "cool white fluorescent lamp W", a region 406 corresponds to a "white fluorescent lamp WW", and a region 407 corresponds to a "tungsten light". As shown in FIG. 4, the shade 401, daylight color fluorescent lamp (D) 402, and clear weather 403 partially overlap each other, so the light source may be estimated as the daylight color fluorescent lamp (D) 402 or clear weather 403 despite the fact that an image of interest is captured in the shade 401. Note that the shade 401 has a PSF different from those of the daylight color fluorescent lamp (D) 402 and clear weather 403. Therefore, when a filter optimum for a specific light source is prepared and another light source is incorrectly estimated as the certain one light source, an image after a recovery process suffers from stains or ringing.

To avoid this situation, the filter memory 306 stores recovery filters of three types:

(1) A recovery filter optimum for light sources: A recovery filter for manually set light sources and for light sources (for flash, a sunlight color fluorescent lamp N, and a cool white fluorescent lamp W in this embodiment) for which other light sources are less likely to be incorrectly estimated as the light source estimation result.

(2) Recovery filters for light sources expected to be estimated with uncertainty: Recovery filters for which other light sources are more likely to be incorrectly estimated as the light source estimation result. In other words, they are recovery filters robust against a plurality of less distinguishable light sources. In this embodiment, they are a filter common to three light sources (shade, a daylight color fluorescent lamp D, and clear weather), and a filter common to two light sources (a white fluorescent lamp WW and a tungsten light).

(3) Recovery filters for light sources which cannot be estimated: Recovery filters for non-estimated light sources corresponding to the determination result "other light sources". In this embodiment, filters are prepared for light sources such as cloudy weather, standard light A, standard light B, standard light C, D55, D65, D75, and D50.

Although a case in which the light source is estimated from the ratios R/G and B/G has been exemplified above, various other light source estimation methods are available. However, note that the degrees of uncertainty of these light source estimation methods are known in advance, so the above-mentioned three types of filters need only be prepared based on the information on these degrees.

[Creation of Robust Recovery Filter]

R(u,v) of a recovery filter commonly used for a plurality of light sources expected to be estimated with uncertainty is given by:

$$R(u,v)=\{1/A(u,v)\}\times A(u,v)^2/\{A(u,v)^2+|S(u,v)|+c\} \qquad (6)$$

where A(u,v) is the average of P(u,v) respectively obtained from these light sources, S(u,v) is the variance, and c is a very small constant.

That is, as the variance of the MTFs of a plurality of light sources expected to be estimated with uncertainty decreases, the recovery filter R(u,v) comes close to the inverse filter of the average A(u,v). In contrast, as the variance increases, the denominator of equation (6) increases. In this case, therefore, the value of the recovery filter R(u,v) decreases, so the strength of a recovery process decreases. When a recovery filter is created in this way, the sensitivity of the recovery filter to a difference in light source decreases, thus improving its robustness.

Figure 5:
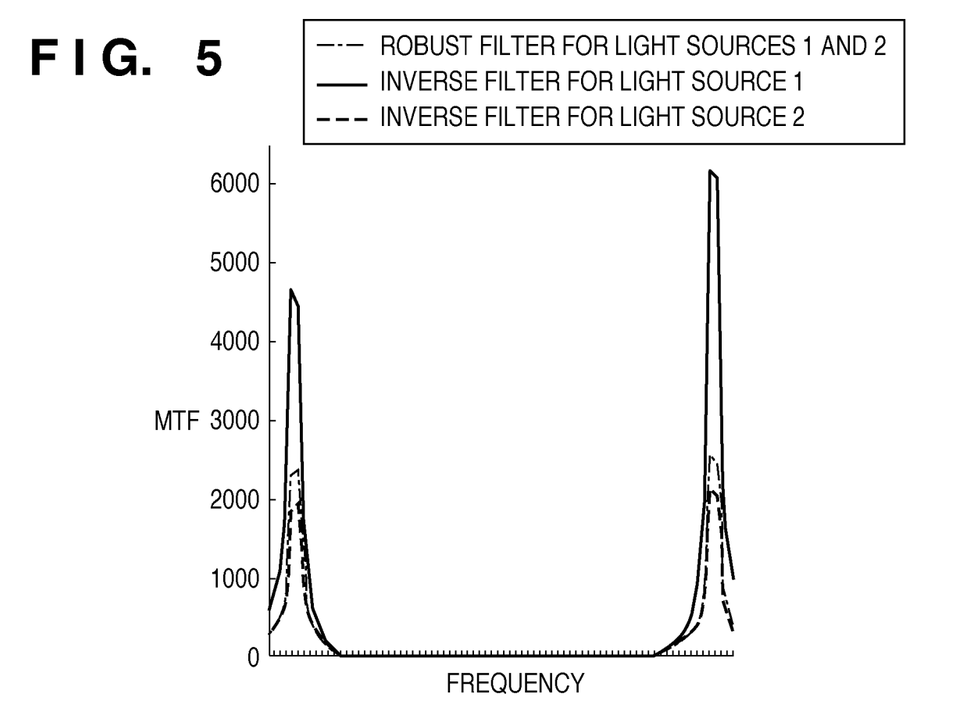
FIG. 5 is a graph showing the characteristic of a robust recovery filter (the reciprocals of the MTFs).

FIG. 5 is a graph showing the characteristic of a robust recovery filter created by the method described above (the reciprocals of the MTFs). FIG. 5 shows the characteristic of the robust recovery filter for light sources 1 and 2 shown in FIG. 1A. The MTF of the robust recovery filter in frequency ranges in which light sources 1 and 2 have a large difference (large variance) is set slightly smaller than the average of the MTFs of light sources 1 and 2. Hence, an image captured under light source 1 is corrected at a small strength, whereas that captured under light source 2 is corrected at a slightly large strength but its excessive correction is kept to a small extent.

For example, to create a recovery filter common to two light sources, a white fluorescent lamp WW and a tungsten light, an average and variance calculated from the MTFs of these two light sources need only be substituted into equation (6). Also, to create a recovery filter common to three light sources, shade, a daylight color fluorescent lamp D, and clear weather, an average and variance calculated from the MTFs of these three light sources need only be substituted into equation (6).

A recovery filter (to be referred to as a general-purpose recovery filter hereinafter) for light sources which cannot be estimated need only be created in the same way as above. That is, the MTFs of light sources, such as cloudy weather, standard light A, standard light B, standard light C, D55, D65, D75, and D50, which are determined as "other light sources" by the light source determiner 305 are measured in advance, and an average and variance calculated from these MTFs are substituted into equation (6), thereby creating a recovery filter. Note that a variety of light sources are desirably adopted to create this recovery filter.

In this manner, in correspondence with different light sources, the filter memory 306 stores 10 types of recovery filters:

light source optimization recovery filters exclusively for a flash, clear weather, cloudy weather, a daylight color fluorescent lamp D, a tungsten light, a sunlight color fluorescent lamp N, and a cool white fluorescent lamp W light source sharing recovery filters common to shade, a daylight color fluorescent lamp D, and clear weather, and common to a white fluorescent lamp WW and a tungsten light general-purpose filter Also, the MTF of a light source changes depending on the type of lens 301. For this reason, when the lens 301 is exchangeable, the above-mentioned recovery filters are stored in a read-only memory (ROM) of the lens 301, and the ROM is referred to or the recovery filters are uploaded from the ROM to the filter memory 306.

[Image Processor]

Figure 6:
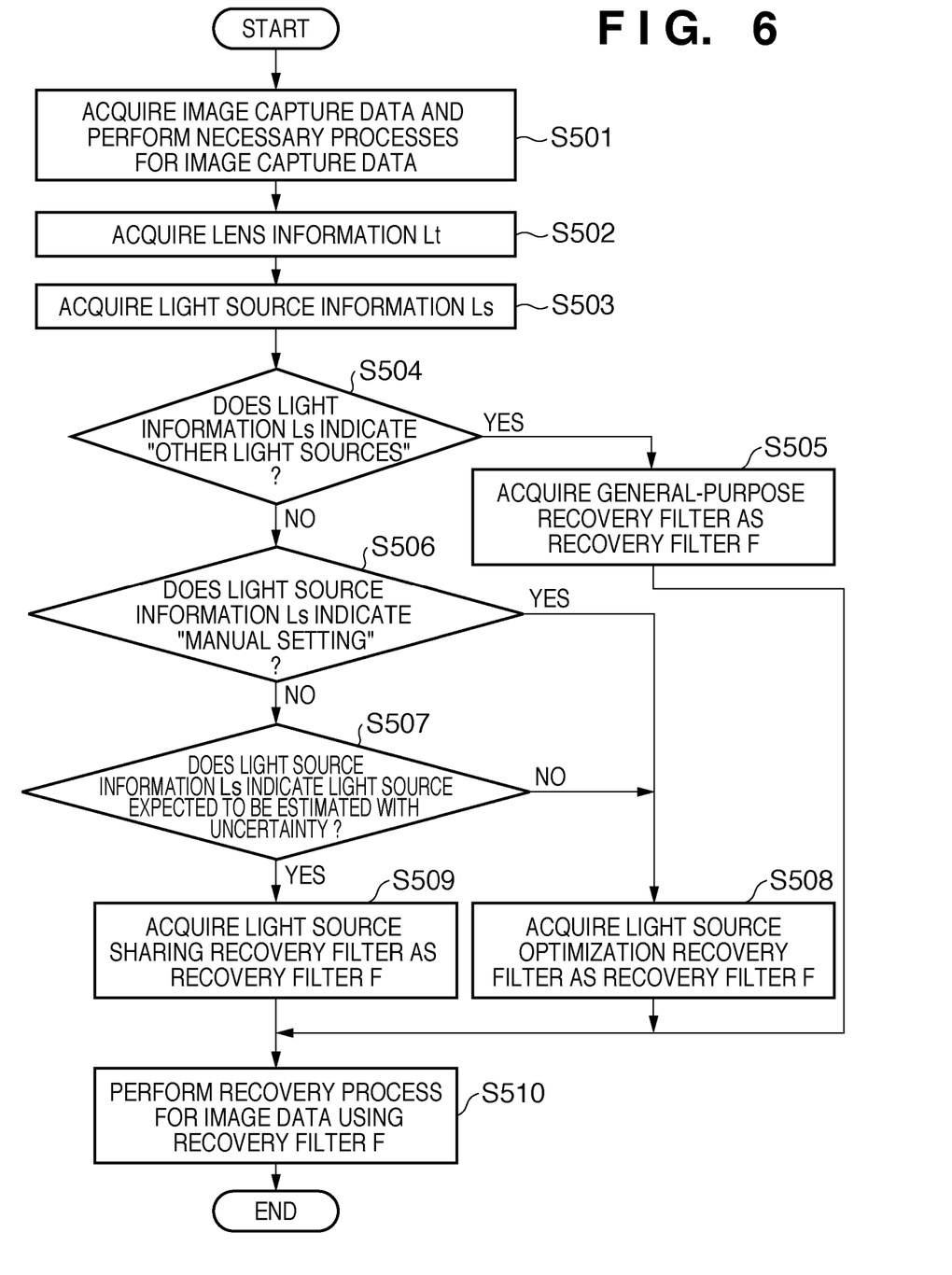
FIG. 6 is a flowchart for explaining a recovery process by an image processor.

FIG. 6 is a flowchart for explaining a recovery process by the image processor 307.

The image processor 307 acquires image capture data from the buffer memory 304, and performs necessary processes for the acquired image capture data (S501). The necessary processes include demosaicing and a process of compensating for defects of the image capture device 302 prior to the demosaicing.

The image processor 307 acquires information (to be referred to as lens information hereinafter) Lt indicating the type of lens 301 from the controller (not shown) and the lens 301 of the image capture apparatus (S502). Moreover, the image processor 307 acquires information (to be referred to as light source information hereinafter) Ls indicating the type of light source estimated by the light source determiner 305 (S503). Note that it is unnecessary to acquire the lens information Lt if the type of lens is fixed as in a compact digital camera.

The image processor 307 determines whether the light source information Ls indicates "other light sources" (S504). In other words, the image processor 307 determines whether a specific light source is estimated. If the light source information Ls indicates "other light sources", the image processor 307 acquires a general-purpose recovery filter corresponding to the lens information Lt from the filter memory 306 as a recovery filter F (S505).

In contrast, if the light source information Ls indicates a specific light source, the image processor 307 determines whether the acquired light source information Ls indicates "manual setting" (S506), and determines whether the light source information Ls indicates a light source expected to be estimated with uncertainty (S507). If the light source information Ls indicates "manual setting" or a light source expected to be estimated with certainty, the image processor 307 acquires a light source optimization recovery filter corresponding to the lens information Lt and the light source indicated by the light source information Ls from the filter memory 306 as a recovery filter F (S508). In contrast, if the light source information Ls does not indicate "manual setting" and indicates a light source expected to be estimated with uncertainty, the image processor 307 acquires a light source sharing recovery filter corresponding to the lens information Lt and the light source indicated by the light source information Ls from the filter memory 306 as a recovery filter F (S509).

The image processor 307 performs a recovery process for the demosaiced image data using the acquired recovery filter F, and outputs the image data after the recovery process (S510).

In this manner, a satisfactory recovery process result can be obtained by preparing the above-mentioned light source optimization recovery filters, light source sharing recovery filters, and a general-purpose recovery filter, and performing a recovery process by selectively using the recovery filters in accordance with a manually set light source or an estimated light source. Also, recovery filters each created from the average and variance of the MTFs of a plurality light sources are prepared for light sources which are expected to be estimated with uncertainty and those which cannot be estimated. Hence, although the degree of recovery in such cases is lower than (i.e., the degree of reduction in blur is lower than) that when a filter optimum for a specific light source, image degradation can be prevented from occurring during a recovery process by suppressing an excessive recovery process.

Second Embodiment

Image processing according to the second embodiment of the present invention will be described below. Note that the same reference numerals as in the first embodiment denote the same constituent elements in the second embodiment, and a detailed description thereof will not be given.

A case in which two types of recovery filters (light source optimization recovery filters and light source sharing recovery filters) corresponding to the uncertainty of light source estimation (estimation accuracy) are prepared has been exemplified in the first embodiment. Nevertheless, even a light source estimated with high accuracy does not always have constant spectral characteristics.

Figure 7:
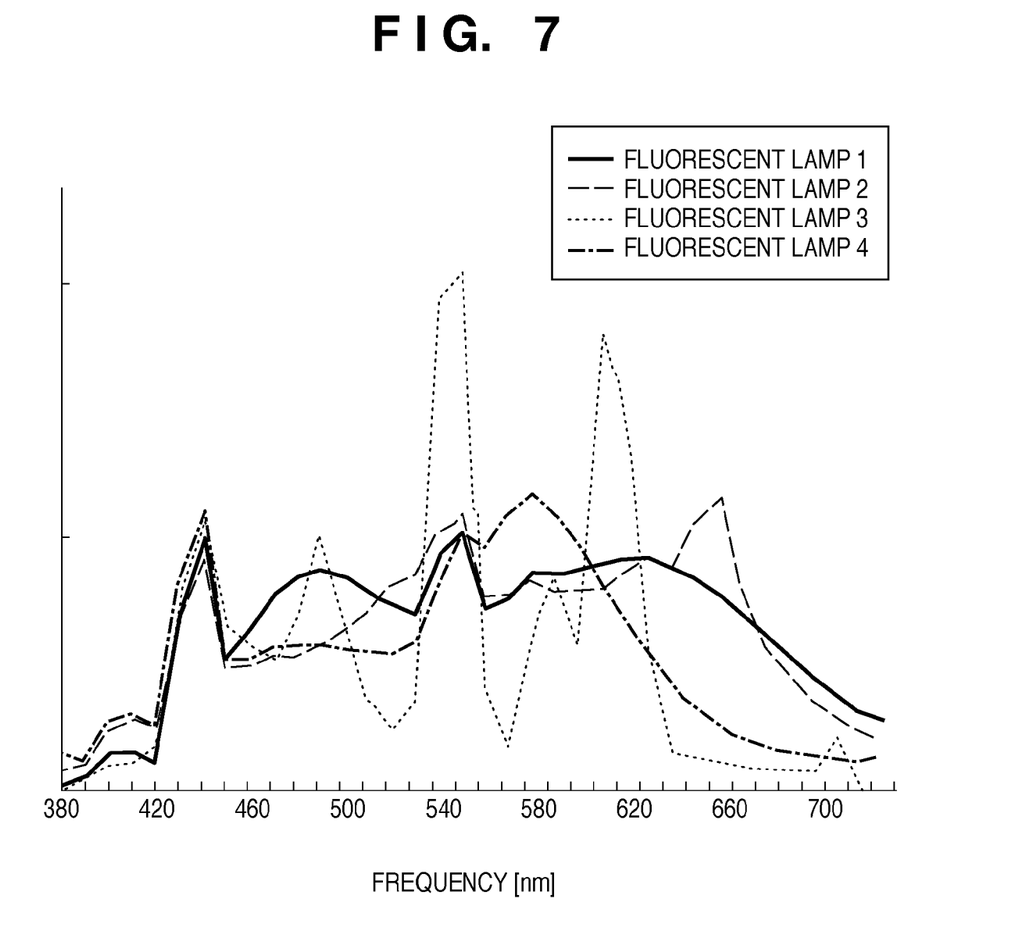
FIG. 7 is a graph illustrating one example of the spectral characteristics of sunlight color fluorescent lamps N.

FIG. 7 is a graph illustrating one example of the spectral characteristics of sunlight color fluorescent lamps N. Even fluorescent lamps conforming to the same standard exhibit different spectral characteristics depending on their manufacturers, as shown in FIG. 7. Therefore, even when the light source estimation results obtained under different circumstances are all sunlight color fluorescent lamps N, they may exhibit completely different spectral characteristics. For example, assume that a recovery filter is created from a PSF which assumes the spectral characteristics of fluorescent lamp 1 shown in FIG. 7. In this case, however, if the light source estimated as a sunlight color fluorescent lamp N exhibits the spectral characteristics of, for example, fluorescent lamp 2, 3, or 4 shown in FIG. 7, the use of the created recovery filter naturally cannot yield a satisfactory recovery result. Hence, it is often better to create a recovery filter with high robustness even for a light source estimated with high accuracy.

For example, a recovery filter obtained by substituting the average and variance of the MTFs of four types of light sources, fluorescent lamps 1 to 4 shown in FIG. 7 into equation (6) is stored in a filter memory 306 as a light source optimization recovery filter for a sunlight color fluorescent lamp N.

Third Embodiment

Image processing according to the third embodiment of the present invention will be described below. Note that the same reference numerals as in the first and second embodiments denote the same constituent elements in the third embodiment, and a detailed description thereof will not be given.

A case in which the image processor 307 of the image capture apparatus performs a recovery process has been exemplified in the first and second embodiments. However, software which acquires a data file of the captured image data (or image capture data) and runs on, for example, a personal computer (PC) can also perform a recovery process, in place of the image capture apparatus.

Figure 8A:
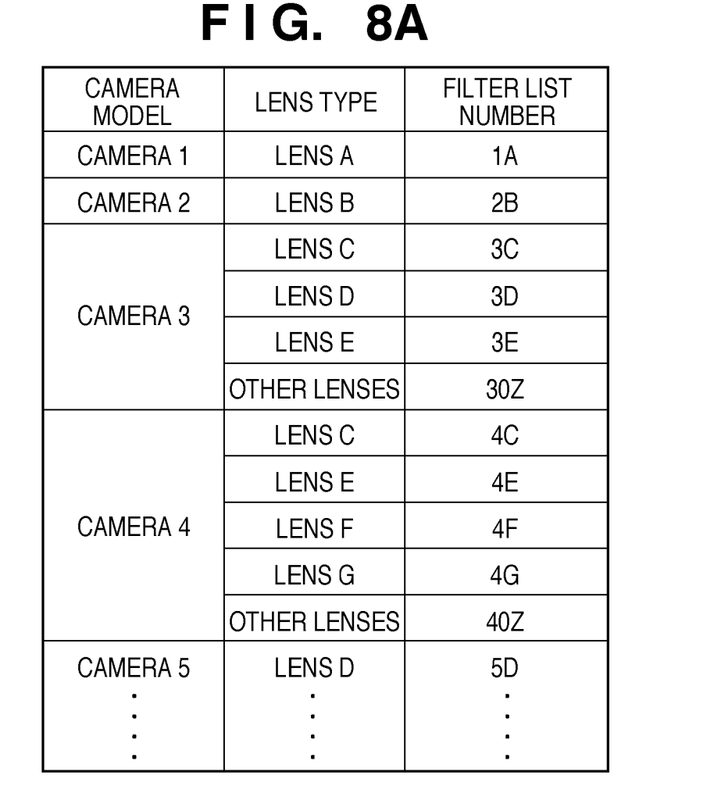
FIG. 8A is a view illustrating one example of a filter table held in software.

FIG. 8A is a view illustrating one example of a filter table held in software. Software which performs a recovery process holds a table describing filter list numbers, as shown in FIG. 8A, assigned to combinations of the models of cameras and the types of imaging lenses.

Figure 8B:
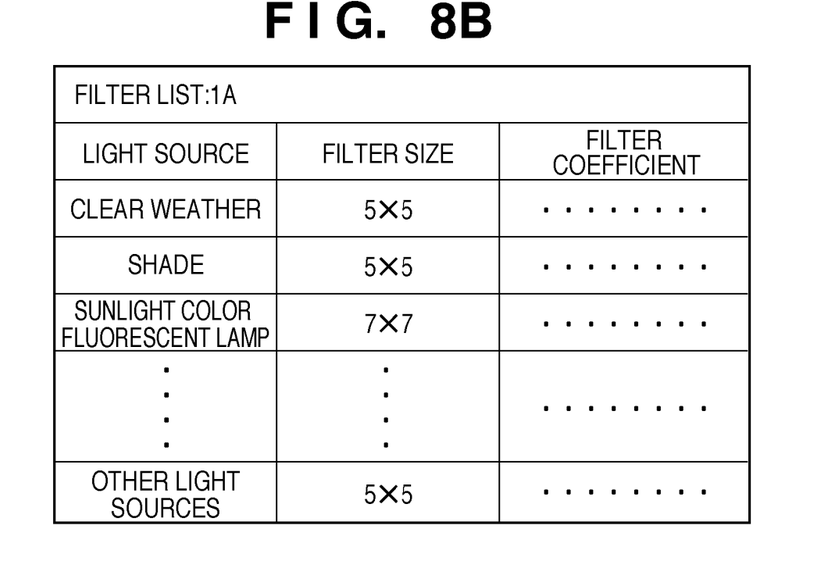
FIG. 8B is a view showing a table describing recovery filters corresponding to a filter list number.

FIG. 8B is a view showing a table describing recovery filters corresponding to filter list number 1A. That is, software which performs a recovery process holds the sizes and coefficients of recovery filters calculated in advance for respective types of light sources.

A case in which an image data file in the Exif format stores in advance image data before a recovery process will be explained below.

Figure 9A:
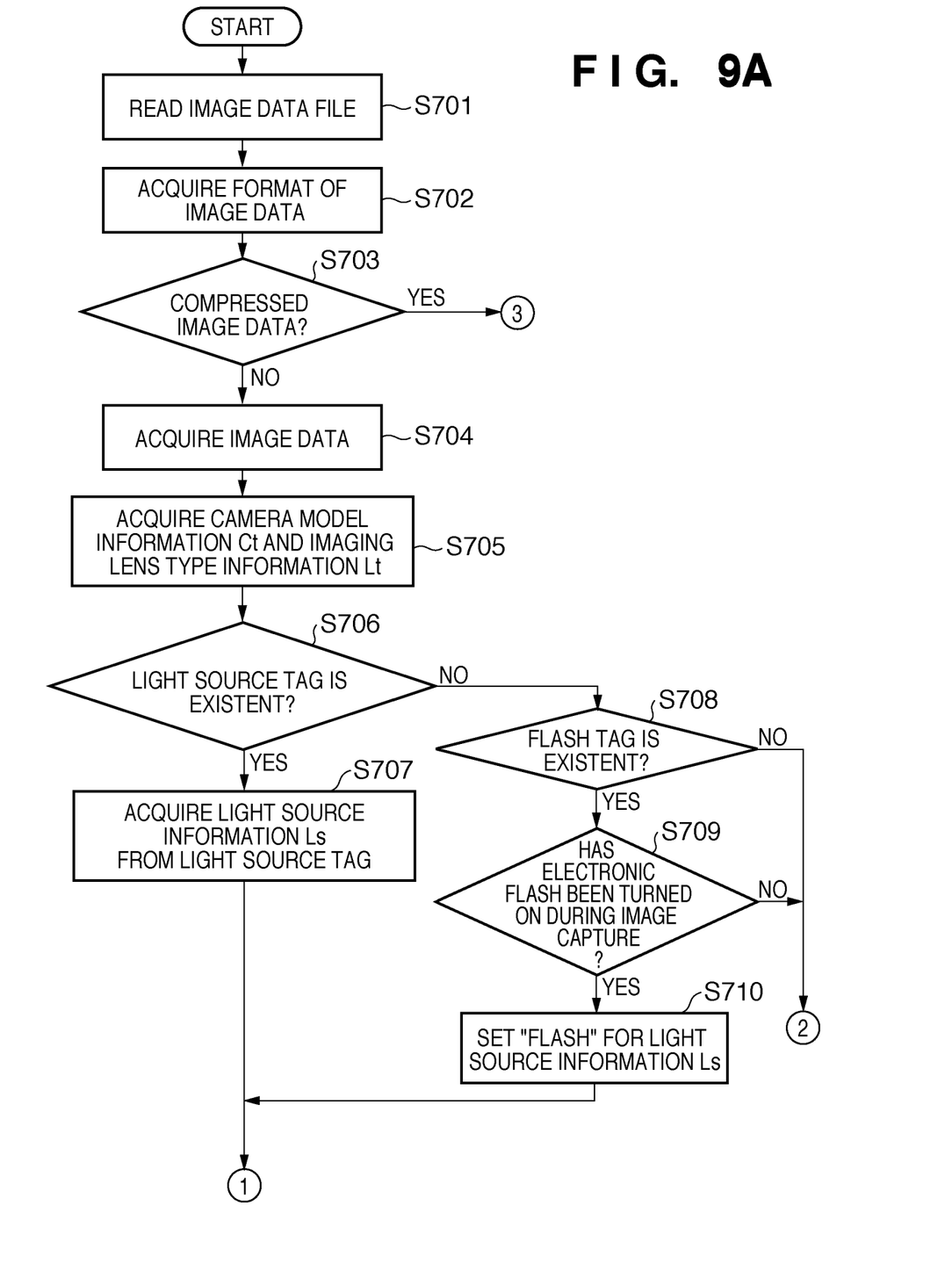
FIGS. 9A and 9B are flowcharts for explaining a recovery process by software.
Figure 9B:
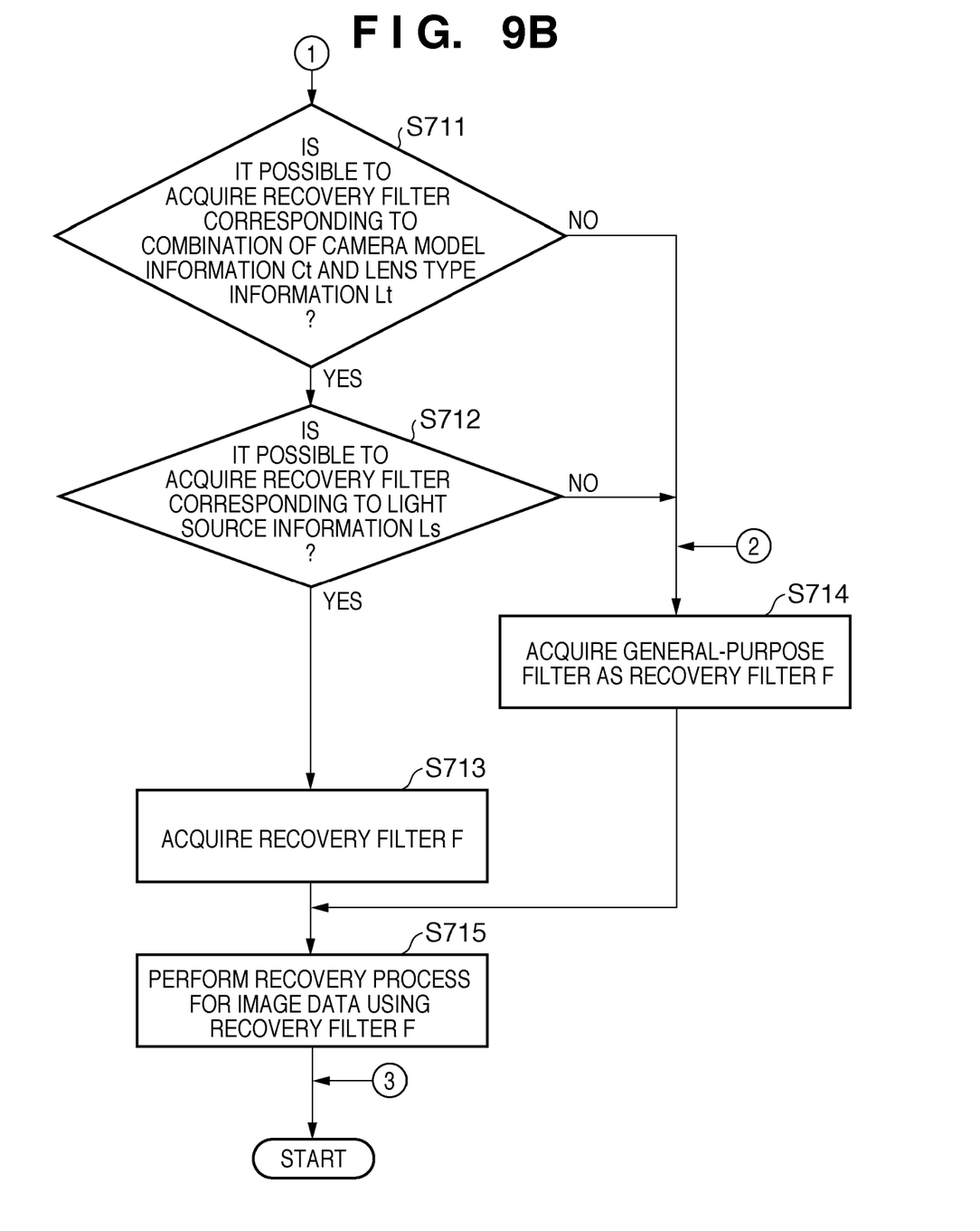

FIGS. 9A and 9B are flowcharts for explaining a software-based recovery process.

First, a data file of image data to undergo a recovery process is read (S701), and the format of the image data is acquired (S702).

In the Exif format, image data is stored in a data file in one of the formats of JPEG compression, uncompressed RGB, and uncompressed YCbCr. If the header data is 0xffd8, the image data is encoded in the JPEG compression format. If the header data is 0x4949 or 0x4d4d, the image data is encoded in the uncompressed TIFF format. If the image data is encoded in an uncompressed format, it is determined whether the YCbCr sub-sampling tag (0x212) is present in 0th IFD containing tags associated with the configuration of image data. If no YCbCr sub-sampling tag is present, the uncompressed RGB format is determined. However, if the YCbCr sub-sampling tag is present, YCbCr4:2:2 is determined if its value is [2,1] or YCbCr4:2:0 is determined if its value is [2,2].

It is then determined whether the image data is compressed or uncompressed (S703). If the image data is compressed (i.e., is compressed in the JPEG format), it is determined that no satisfactory recovery process result is expected to be obtained, and the recovery process ends.

If the image data is uncompressed, the image data is acquired from the data file (S704). Image data which starts from an offset described in a strip offset tag (0x111) of 0thIFD is acquired. Note that if the format is YCbCr, the image data is converted into RGB data after being acquired.

Camera model information Ct and imaging lens type information Lt are then acquired (S705). If the image data is in the Exif format, the camera model number is described in a model tag (0x110) of 0th IFD. In, for example, a compact camera, an imaging lens is logically determined from its model name. However, in a camera, such as a single-lens reflex camera, including an exchangeable imaging lens, an imaging lens cannot be specified, so imaging lens type information Lt must be acquired. The Exif format does not provide a description concerning the imaging lens type, so imaging lens type information Lt is acquired by referring to, for example, a MakerNote tag (0x927C) which describes information unique to the maker.

It is then determined whether the Exif IFD describes a LightSource tag (0x9208) indicating the type of light source (S706). If a light source tag is present, light source information Ls is acquired from the tag (S707). Note that as the values of the LightSource tag (0x9208), 21 types (including "other light sources"): unknown, Daylight, Fluorescent, Tungsten (incandescent light), Flash, Fine weather, Cloudy weather, Shade, Daylight fluorescent (D 5700-7100 K), Day white fluorescent (N 4600-5400 K), Cool white fluorescent (W 3900-4500 K), White fluorescent (WW 3200-3700 K), Standard light A, Standard light B, Standard light C, D55, D65, D75, D50, ISO studio tungsten, and other light source are defined.

However, if no light source tag is present, it is determined whether the Exif IFD describes a Flash tag (0x9209) indicating the state of an electronic flash during image capture (S708). If a Flash tag is present, it is determined whether an electronic flash was turned on during image capture (S709). Note that whether or not an electronic flash was turned on during image capture can be determined from the value of the least significant bit (LSB) of a Flash tag, and LSB='0' indicates OFF of an electronic flash and LSB='1' indicates ON of an electronic flash. If an electronic flash was turned on during image capture, "flash" is set for the light source information Ls (S710).

If the light source information Ls is acquired from a LightSource tag or "flash" is set for the light source information Ls, it is determined whether a recovery filter corresponding to a combination of the camera model information Ct and the lens type information Lt can be acquired (S711). That is, it is checked by looking up the table shown in FIG. 8A whether the software holds a recovery filter corresponding to a combination of the camera model information Ct and the lens type information Lt. If the software holds a recovery filter corresponding to a combination of the camera model information Ct and the lens type information Lt, it is determined by looking up the table shown in FIG. 8B whether a recovery filter corresponding to the light source information Ls can be held, that is, acquired (S712). If a recovery filter corresponding to the light source information Ls can be acquired, the filter is acquired as a recovery filter F (S713).

In contrast, if it is determined that no flash tag is present (S708), that an electronic flash was not turned on (S709), or that a recovery filter cannot be acquired (S711 or S712), a general-purpose recovery filter is acquired as a recovery filter F (S714).

A recovery process is performed for the image data using the recovery filter F, and the image data after the recovery process is output (S715).

To store recovery filters corresponding to a wide variety of imaging lenses and light sources in a filter memory 306 of the image capture apparatus, a large storage capacity is necessary. As in this embodiment, when a recovery process is performed by software running on the PC after image capture, it is easy to use a storage device with a large storage capacity and to download a recovery filter via a network. This makes it possible to adopt recovery filters corresponding to a wide variety of imaging lenses and light sources.

Although the Exif format has been exemplified above as a file format in which image data before recovery is stored, a file in another format such as a RAW data format unique to each manufacturer may be adopted as long as the file format contains information in image capture.

Also, if the Exif format is assumed, the image compression scheme is lossy JPEG. In the above description, a recovery process is not performed when the image is compressed in the lossy JPEG format because image degradation has occurred during the data compression process and a recovery process is expected to be of little effect in this case. However, a recovery process may be performed even in this case, as in case of an uncompressed format. In this case, unless the image has the Exif format, the image is expected to be compressed in a lossless compression format (e.g., JPEG2000 or PNG). A considerable effect of a recovery process is expected in cases where lossless compression is used. Hence, a recovery process may be performed if it is determined that the compression scheme is lossless compression.

Fourth Embodiment

Image processing according to the fourth embodiment of the present invention will be described below. Note that the same reference numerals as in the first to third embodiments denote the same constituent elements in the fourth embodiment, and a detailed description thereof will not be given.

A recovery filter corresponding to the type of light source in image capture is applied to a recovery process in the first to third embodiments. However, a PSF changes depending not only on the type of light source but also on other image capture conditions such as the zoom ratio and the subject distance. A PSF is also known to change depending on the image height. In view of this, a recovery process is desirably performed by setting a recovery filter by taking account of not only the type of light source but also the zoom ratio, the subject distance, the stop, and the image height within the field as items of image capture information.

In that case, the zoom ratio, the subject distance, and the stop (F-number) are acquired as items of image capture information in step S502 (acquisition of lens information Lt) in the process shown in FIG. 6. Then, in step S505, S508, or S509 (acquisition of a recovery filter F), a recovery filter group Fg corresponding to light source information Ls, lens type information Lt, zoom ratio, subject distance, and stop is selectively acquired.

The recovery filter group Fg includes a plurality of recovery filters corresponding to the image height. Hence, in step S510 (a recovery process using a recovery filter), it is only necessary to selectively acquire a recovery filter F corresponding to the image height of a pixel, and perform a recovery process on the pixel.

Also, to perform a recovery process for image data stored in a data file, as in the third embodiment, it is only necessary to acquire items of information indicating the zoom ratio, the subject distance, and the stop from Exif data.

In this manner, a recovery process which takes account of not only the type of light source but also the zoom ratio, the subject distance, the stop, and the image height can yield a more satisfactory recovery result than that yielded when only the type of light source is taken into consideration although a storage capacity for holding recovery filters increases.

Modification of Embodiments

Although a Wiener filter is adopted in the above description, the same effect can be obtained by an inverse filter.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-123540, filed May 21, 2009, which is hereby incorporated by reference herein in its entirety.

What is claimed is:

1. An image processing apparatus comprising:
an input section configured to input captured image data;
a determiner configured to determine at least one type of light source in a capture of the image data using parameters calculated from the input captured image data;
a setting section configured to set a recovery filter corresponding to the determination result; and
an image processor configured to perform a recovery process for the image data using the set recovery filter,
wherein, if the parameters indicate plural types of light sources, the determiner determines that there are plural types of light sources in the captured image data, and the setting section determines that an uncertainty of the determination result is high and sets, as a recovery filter, a light source sharing recovery filter created from a plurality of point spread functions which correspond to a plurality of light sources and include a point spread function corresponding to the type of light source indicated by the determination result.

2. The apparatus according to claim 1, wherein the recovery filter comprises a general-purpose recovery filter created from a plurality of point spread functions corresponding to types of a plurality of light sources which cannot be determined by the determiner.

3. The apparatus according to claim 2, wherein the setting section sets the general-purpose recovery filter as the recovery filter if the determination result indicates that the determination is impossible.

4. The apparatus according to claim 1, further comprising an acquisition section configured to acquire lens information used in the capture of the image data,
wherein the setting section sets a recovery file based on the lens information, the determination result, and the uncertainty of the determination result.

5. An image processing apparatus comprising:
an input section configured to input captured image data;
a determiner configured to determine at least one type of light source in a capture of the image data using parameters calculated from the input captured image data;
a setting section configured to set a recovery filter corresponding to the determination result; and
an image processor configured to perform a recovery process for the image data using the set recovery filter,
wherein, if the parameters indicate a type of light source, the determiner determines the type of light source in the captured image data, and the setting section determines that an uncertainty of the determination result is low and sets, as a recovery filter, a light source optimization recovery filter created from a point spread function corresponding to the type of light source indicated by the determination result.

6. An image processing method comprising:
using a processor to perform the steps of:
inputting captured image data;
determining at least one type of light source in a capture of the image data using parameters calculated from the input capture image data;
setting a recovery filter corresponding to the determination result; and
performing a recovery process for the image data using the set recovery filter,
wherein, if the parameters indicate plural types of light sources, the determination step determines that there are plural types of light sources in the captured image data, and it is determined that an uncertainty of the determination result is high and a light source sharing recovery filter created from a plurality of point spread functions, which correspond to a plurality of light sources and include a point spread function corresponding to the type of light source indicate by the determination result, is set as a recovery filter in the setting step.

7. A non-transitory computer-readable medium storing a computer-executable program for causing a computer to perform an image processing method, the method comprising the steps of:
- inputting captured image data;
- determining at least one type of light source in a capture of the image data using parameters calculated from the input captured image data;
- setting a recovery filter corresponding to the determination result; and
- performing a recovery process for the image data using the set recovery filter,
- wherein, if the parameters indicate plural types of light sources, the determination step determines that there are plural types of light sources in the captured image data, and it is determined that an uncertainty of the determination result is high and a light source sharing recovery filter created from a plurality of point spread functions, which correspond to a plurality of light sources and include a point spread function corresponding to the type of light source indicated by the determination result, is set as a recovery filter in the setting step.

8. An image processing method comprising:
using a processor to perform the steps of:
- inputting captured image data;
- determining at least one type of light source in a capture of the image data using parameters calculated from the input captured image data;
- setting a recovery filter corresponding to the determination result; and
- performing a recovery process for the image data using the set of recovery filter,
- wherein, if the parameters indicate a type of light source, the determining step determines the type of light source in the captured image data, and it is determined that an uncertainty of the determination result is low and a light source optimization recovery filter created from a point spread function corresponding to the type of light source indicated by the determination result is set as a recovery filter in the setting step.

9. A non-transitory computer-readable medium storing a computer-executable program for causing a computer to perform an image processing method, the method comprising the steps of:
- inputting captured image data;
- determining at least one type of light source in a capture of the image data using parameters calculated from the input captured image data;
- setting a recovery filter corresponding to the determination result; and
- performing a recovery process for the image data using the set recovery filter,
- wherein, if the parameters indicate a type of light source, the determining step determines the type of light source in the captured image data, and it is determined that an uncertainty of the determination result is low and a light source optimization recovery filter created from a point spread function corresponding to the type of light source indicated by the determination result is set as a recovery filter in the setting step.

* * * * *